July 3, 1956 W. H. McLELLAN 2,753,494
TIME DELAY CIRCUIT BREAKER
Filed June 10, 1952
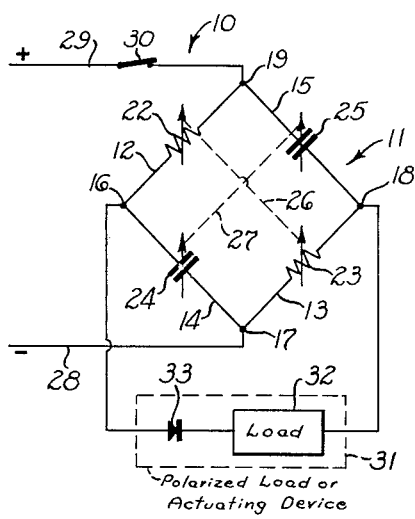
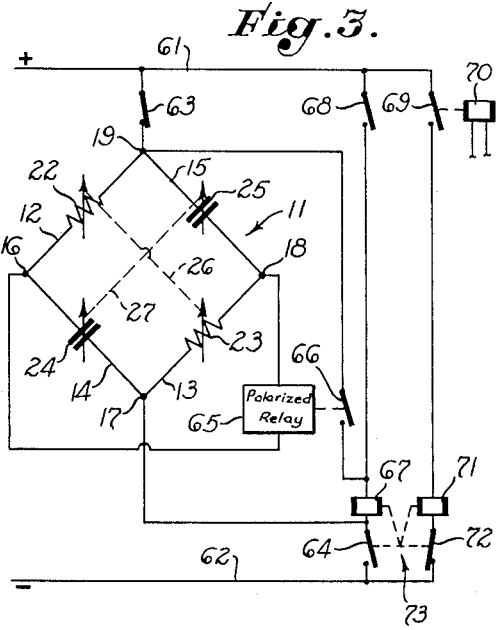
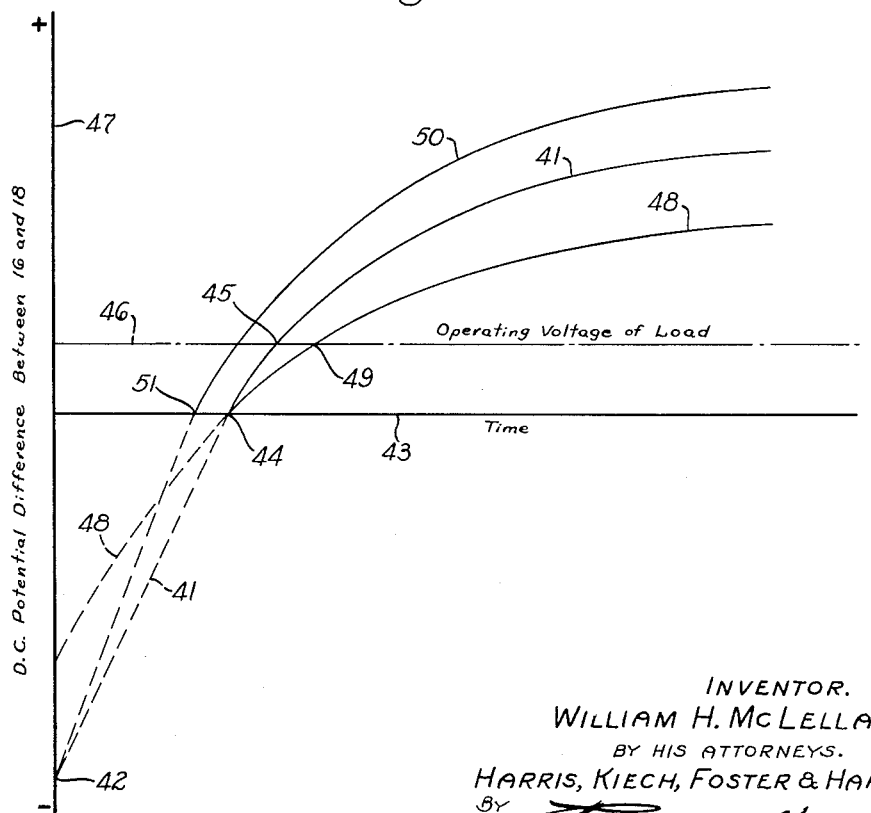
INVENTOR.
WILLIAM H. McLELLAN
BY HIS ATTORNEYS.
HARRIS, KIECH, FOSTER & HARRIS

United States Patent Office 2,753,494
Patented July 3, 1956

2,753,494

TIME DELAY CIRCUIT BREAKER

William H. McLellan, Pasadena, Calif., assignor to Kelman Electric and Manufacturing Company, Los Angeles, Calif., a corporation of California Application June 10, 1952, Serial No. 292,753

7 Claims. (Cl. 317—141)

The present invention relates in general to circuit breakers, and more particularly, to a time delay circuit for use in the control circuit of a circuit breaker, although it will be understood that the time delay circuit is susceptible of other applications without departing from the spirit of the invention.

The time delay circuit of the present invention generally includes a bridge having resistors in two opposed arms thereof and having capacitors in the other two opposed arms, the arms in which the resistors and capacitors are located being referred to hereinafter as resistor and capacitor arms, respectively, as a matter of convenience. The time delay circuit further includes a source of D. C. potential connected across one diagonal of the bridge, and includes a polarized load connected across the other diagonal of the bridge. The polarized load may comprise a rectifier in series with a load which has a bidirectional response, i. e., which responds to current flow in either direction, or the polarized load may comprise a device which is in itself polarized and thus has a unidirectional response, a polarized relay being an example of the latter. Various other devices or circuits responding to current flow in one direction only may also be used as the polarized load in the time delay circuit of the invention.

A primary object of the present invention is to provide a time delay circuit of the foregoing general character wherein the resistors in the bridge are of equal resistance and the capacitors therein are of equal capacitance. With this construction, the time delay circuit is provided with a "basic time delay" which is constant and independent of variations in the applied D. C. voltage, the term "basic time delay" being defined hereinafter. Consequently, the "basic time delay" is unaffected by such variations in the applied D. C. voltage as might arise from the gradual discharging of a battery supplying power to the bridge, which is an important feature of the invention.

Another object of the invention is to provide a time delay circuit wherein the resistors, or the capacitors, or both, are variable, and are coupled together for simultaneous adjustment to provide for varying the basic time delay while maintaining the desired equality of capacitance and of resistance.

Another object is to provide a polarized load which operates at a low voltage. This results in high sensitivity, which is an important feature of the invention.

Another object is to provide a control circuit for a circuit breaker which includes a circuit closing mechanism and which includes the time delay circuit of the invention, the time delay circuit being operatively connected to the circuit closing mechanism so as to actuate same.

The foregoing objects and advantages of the present invention, together with various other objects and advantages thereof which will become apparent, may be attained with the exemplary embodiments of the invention which are illustrated in the accompanying drawing and which are described in detail hereinafter.

Referring to the drawing:

Fig. 1 is a diagrammatic view illustrating the time delay circuit of the invention;

Fig. 2 is a graph illustrating the operation of the time delay circuit of the invention with various applied D. C. voltages; and Fig. 3 is a diagrammatic view illustrating a control circuit for a circuit breaker which incorporates the time delay circuit of the invention.

Referring first to Fig. 1 of the drawing, the time delay circuit of the invention is designated generally by the numeral 10 and includes a bridge or bridge circuit 11 having opposed or oppositely located resistor arms 12 and 13 and opposed or oppositely located capacitor arms 14 and 15. The arms 12 and 14 are connected at 16, the arms 13 and 14 are connected at 17, the arms 13 and 15 are connected at 18 and the arms 15 and 12 are connected at 19. The resistor arms 12 and 13 respectively contain resistors 22 and 23 of equal resistance and the capacitor arms 14 and 15 respectively contain capacitors 24 and 25 of equal capacitance. Either the resistors 22 and 23, or the capacitors 24 and 25, or both, are variable and are coupled together, both being shown as variable in the drawing. The coupled or ganged connection between the resistors 22 and 23 is designated by the broken line 26 and the coupled or ganged connection between the capacitors 24 and 25 is designated by the broken line 27. With this arrangement, both the resistors 22 and 23 may be adjusted while maintaining the desired resistance equality, the same being true of the capacitors 24 and 25. As will be discussed in more detail hereinafter, maintaining resistance equality and capacitance equality permits varying the basic time delay of the circuit 10 while maintaining the basic time delay independent of applied D. C. voltage variations.

A suitable source of D. C. potential, such as a battery, not shown, is connected across one diagonal of the bridge 11, as by leads 28 and 29 connected to the points 17 and 19, a switch 30 being disposed in one of the leads, e. g., the lead 29. In the drawing, the lead 29 is shown as connected to the positive side of the D. C. potential source and the lead 28 as connected to the negative side thereof.

Connected across the other diagonal of the bridge 11, i. e., to the points 16 and 18, is a polarized load or polarized actuating device 31, the nature of this load or actuating device being dependent upon the use to be made of the time delay circuit 10. The polarized load 31 may be polarized in itself, i. e., may be unidirectional in its response, or it may comprise a load 32 having a bidirectional response plus a rectifier 33 in series therewith. As hereinbefore suggested, the polarized load 31 may be of any desired type, such as a polarized relay, a polarized electronic circuit, or the like. Alternatively, if a rectifier 33 is used, the load 32 may be an ordinary relay, or any other desired device or circuit.

Considering the operation of the time delay circuit 10, it will be assumed that the resistors 22 and 23 and the capacitors 24 and 25 have been adjusted to particular values of resistance and capacitance. When the switch 30 is closed, the applied D. C. potential initially exists entirely across the resistors 22 and 23 so that the point 16 is initially negative and the point 18 is initially positive. However, as the capacitors 24 and 25 become charged, the current flow through the resistors 22 and 23 progressively decreases. Consequently, when the voltage across the resistors 22 and 23 decreases to a value equal to that across the capacitors 24 and 25, the points 16 and 18 are at the same potential, i. e., are at zero potential with respect to each other. Ultimately, as the capacitors 24 and 25 become further charged, the point 16 becomes positive relative to the point 18 and, when the point 16 becomes sufficiently positive relative to the point 18, current will flow through the polarized load 31.

The operation of the time delay circuit is illustrated in Fig. 2 of the drawing, which is a plot of the potential difference between the points 16 and 18 versus time. Considering first the curve 41, when the switch 30 is closed, i. e., when time is equal to zero, the potential of the point 16 is negative relative to that of the point 18, as indicated by the point 42 on the curve 41. As the capacitors 24 and 25 become charged, the curve 41 ultimately crosses the line 43 of zero potential difference at the point 44, the point 16 of the bridge 11 thereafter becoming positive relative to the point 18, as indicated by the solid portion of the curve 41. When the potential of the point 16 of the bridge 11 becomes sufficiently positive relative to the point 18 to actuate the polarized load 31, the latter is energized, this condition being represented by the intersection of the curve 41 at the point 45 with a line 46 labelled "operating voltage of load." It is desirable that the operating voltage of the load be low, i. e., it is desirable that the line 46 be close to the line 43, to obtain high sensitivity, which is an important feature of the invention.

The "basic time delay" of the circuit 10 with the values of resistance and capacitance producing the curve 41 is represented by the distance between the point 44 and the zero time axis, i. e., the distance between the point 44 and the line 47. For given values of resistance and capacitance, this basic time delay is constant and independent of the applied D. C. voltage so that the time delay circuit 10, in so far as the basic time delay is concerned, is independent of deterioration of a battery, for example, which is an important feature of the invention. The curve 48 represents the operation of the time delay circuit with a lower applied voltage, i. e., a lower initial potential difference between the points 16 and 18 of the bridge, as indicated by the fact that the curves 48 and 41 intersect the zero potential difference axis 43 at the same point, viz., the point 44.

The basic time delay, $d$, is determined solely by the values of the equal resistances, R, of the resistors 22 and 23 and of the equal capacitances, C, of the capacitors 24 and 25, assuming that the load 31 is unidirectional, i. e., has infinite resistance to current flow in one direction so that current can flow in one direction only, or assuming that the rectifier 33 has infinite back resistance in instances where the rectifier is used. The basic time delay, $d$, may be calculated from the equation for the voltage, V, as a function of time, $t$, across a capacitance C, as it is charged through a resistance, R, from a source of constant D. C. potential, $V_0$, the equation being as follows:

$$V = V_0\left(1 - e^{-\frac{t}{RC}}\right)$$

This equation can be applied to the bridge 11 as long as the point 16 on the bridge is negative with respect to the point 18 because the rectifier 33, or a unidirectional polarized load 31, will isolate the two branches of the bridge. This condition exists from the time that the switch 30 is closed, i. e., from time equals zero, until the points 16 and 18 of the bridge reach the same potential, which is indicated by the point 44, in Fig. 2. The points 16 and 18 of the bridge 11 will reach the same potential when the voltage across each of the capacitors 24 and 25 is equal to one half of the applied voltage. Each capacitor will reach this half-voltage point at the same instant because of the fact that both resistances are equal and both capacitors are equal.

From the foregoing, it will be seen that $t$ is equal to $d$ when V is equal to one half of $V_0$. Solving for $d$ in the foregoing equation under such conditions, we have:

$$1/2 V_0 = V_0\left(1 - e^{-\frac{d}{RC}}\right)$$

$$1/2 = \left(1 - e^{-\frac{d}{RC}}\right)$$

$$-1/2 = -e^{-\frac{d}{RC}}$$

and $$2 = e^{\frac{d}{RC}}$$

$$d = RC \log 2$$

where log 2 is the natural logarithm of 2. Thus, it will be apparent that the basic time delay is independent of the applied voltage, i. e., the point 44 at which the curves 41 and 48 (and other similar curves resulting from other applied voltages) cross the zero potential difference axis 43 is independent of applied voltage, which is an important feature of the invention.

It will be noted that while the basic time delay is unaffected by applied voltage variations, the actual time delay, represented by the distance between the zero time axis 47 and the point 45 where the curve 41 crosses the line 46, or the distance between the zero time axis 47 and the point 49 where the curve 48 crosses the line 46, does vary somewhat with variations in the applied voltage due to the difference between the slopes of the curves 41 and 48. However, variations in the actual time delay may be held to a minimum by making the operating voltage of the polarized load 31 as low as possible, i. e., by making the line 46 as close to the zero potential difference axis 43 as possible. As hereinbefore indicated, lowering the operating voltage of the load also makes the time delay circuit more sensitive, which is another important feature.

In order to vary the basic time delay of the circuit 10, it is merely necessary to vary equally the resistances of the resistors 22 and 23, or the capacitances of the capacitors 24 and 25, or both, the couplings 26 and 27 between the resistors and capacitors maintaining the desired equality. The curve 50 in Fig. 2 of the drawing is illustrative of the operation of the time delay circuit 10 with a reduced basic time delay as compared to the curve 41. It will be noted that, even though the applied voltage is the same, as indicated by the fact that both the curves 41 and 50 intersect the zero time axis 47 at the point 42, the curve 50 crosses the zero potential difference axis 43 at the point 51, which is closer to the zero time axis 47 than the point 44. Other curves and families of curves would result from other values of resistance and/or capacitance.

Thus, the time delay circuit 10 of the invention maintains the basic time delay, $d$, constant, irrespective of applied voltage variations, for particular values of resistance and capacitance because of the resistance and capacitance equality, and permits variations in the basic time delay by providing for equal variation of the capacitance and/or resistance, which are important features of the invention.

The foregoing mathematical presentation is based on the assumption that the polarized load 31 is also unidirectional, i. e., has infinite back resistance. However, this is not essential. The effect of low back resistance in the polarized load 31 is to give an additional path for the current to charge the capacitors 24 and 25. Thus, the basic time delay, $d$, is RC log 2 minus an amount dependent upon the impedance of the load. This effect is independent of the supply voltage unless saturation effects cause the impedance of the device to vary as a function of applied voltage. Thus, although the foregoing simple derivation does not apply in such a case, the basic time delay would be constant with R and C the only variables, assuming the load impedance to be constant. Because of the symmetry of the circuit the capacitors will still reach the half-voltage point together regardless of the back resistance of the load. To restate the above, if the polarized load 31 has low back resistance, R and C alone do not determine the basic time delay, but R and C are the only variables as long as the load impedance is constant so that the principle that variations in the supply voltage do not affect the basic time delay still holds.

Turning now to Fig. 3 of the drawing, illustrated therein is a control circuit for a circuit breaker which embodies the time delay circuit 10 of the invention. The numerals 61 and 62 designate D. C. mains which are connected to a suitable source of D. C. potential, such as a battery, not shown, the main 61 being shown as positive in the drawing and the main 62 as negative. The bridge 11 of the time delay circuit of the invention is connected between the mains 61 and 62, the point 19 of the bridge being connected to the main 61 through a switch 63 and the point 17 of the bridge being connected to the main 62 through a switch 64. The polarized load connected across the other diagonal of the bridge, i. e., to the points 16 and 18 thereon, is, in this instance, shown as a polarized relay 65 which, when energized, closes a switch 66, the latter being connected in series with the switches 63 and 64 through a closing coil or solenoid 67 which is disposed between the switches 66 and 64. Connected in series with the switch 64 and the closing coil 67 is a switch 68. The control circuit for the circuit breaker also includes a switch 69 which is adapted to be closed in response to an overload in the controlled circuit, as by an overload relay 70. The switch 69 is connected across the mains 61 and 62 through a tripping coil or solenoid 71 and a switch 72. The closing coil 67 and the tripping coil 71 are connected to the switches 64 and 72 through a suitable operating mechanism which is designated diagrammatically by the broken lines 73, this operating mechanism being adapted to close the switch 64 and open the switch 72 when the tripping coil 71 is energized and being adapted to close the switch 72 and open the switch 64 when the closing coil 67 is energized. The operating mechanism also opens and closes the controlled circuit. Such operating mechanisms are well known in the circuit breaker art and it is thought unnecessary to disclose the details thereof herein.

Considering the operation of the control circuit illustrated in Fig. 3 of the drawing, the control circuit will automatically reclose the controlled circuit, after the time delay provided for the particular settings of the resistors 22 and 23 and the capacitors 24 and 25, only if the switch 63 is closed. This switch is kept open until the circuit breaker is closed, the circuit breaker being closed by momentary closure of the switch 68, which energizes the closing coil 67. The reclosing operation of the control circuit will now be considered.

Whenever an overload in the controlled circuit occurs, the switch 69 is closed, as by the overload relay 70. This energizes the tripping coil 71 which actuates the operating mechanism 73 of the circuit breaker to open the controlled circuit and, at the same time, to open the switch 72 and close the switch 64. Closure of the switch 64 energizes the bridge 11 and, after the predetermined time delay for which the resistors 22 and 23 and the capacitors 24 and 25 are set, causes energization of the polarized relay 65.

Energization of the polarized relay 65 results in closure of the switch 66 to energize the closing coil 67, the latter then actuating the operating mechanism 73 to close the controlled circuit, and at the same time, to open the switch 64 and close the switch 72. Such closure of the switch 72 resets the tripping coil 71 so that, if the overload still exists, the circuit breaker immediately reopens. Thus, the time delay circuit of the invention provides a reclosing time delay which may be varied readily by varying the resistance of the resistors 22 and 23, the capacitance of the capacitors 24 and 25, or both.

While I have disclosed exemplary embodiments of my invention herein and have disclosed an exemplary application thereof, it will be understood that various changes, modifications and substitutions may be incorporated in the embodiments disclosed and that the invention may be applied in other ways all without departing from the spirit of the invention.

I claim as my invention:

1. In a time delay circuit, the combination of: a bridge having opposed resistor arms and opposed capacitor arms, said resistor arms respectively having resistors of equal resistance therein and said capacitor arms respectively having capacitors of equal capacitance therein; a source of D. C. potential connected across one diagonal of said bridge; a polarized load connected across the other diagonal of said bridge; and means for blocking current flow through said polarized load in one direction.

2. A time delay circuit according to claim 1 wherein said capacitors are variable and are ganged together.

3. A time delay circuit according to claim 1 wherein said resistors are variable and are ganged together.

4. In a time delay circuit, the combination of: a bridge having opposed resistor arms and opposed capacitor arms, said resistor arms respectively having resistor elements of equal resistance therein and said capacitor arms respectively having capacitor elements of equal capacitance therein, said elements in one of said pairs of opposed arms being variable and being coupled together for simultaneous variation; and a polarized load connected across the other diagonal of said bridge, said other diagonal having means for blocking current flow therethrough in one direction.

5. In a control circuit for a circuit breaker, the combination of: circuit closing means; and a time delay circuit operatively connected to said circuit closing means for actuating same, said time delay circuit including a bridge having opposed resistor arms and opposed capacitor arms, said resistor arms respectively having resistors of equal resistance therein and said capacitor arms respectively having capacitors of equal capacitance therein, said time delay circuit further including a source of D. C. potential connected across one diagonal of said bridge, and still further including a polarized actuating device connected across the other diagonal of said bridge and operatively connected to said circuit closing means, said other diagonal having means for blocking current flow therethrough in one direction.

6. A control circuit for a circuit breaker as defined in claim 5 wherein said resistors are variable and are coupled together for simultaneous variation of said resistance.

7. A control circuit for a circuit breaker as defined in claim 5 wherein said capacitors are variable and are coupled together for simultaneous variation of said capacitance.

References Cited in the file of this patent

UNITED STATES PATENTS

| | | |
|---|---|---|
| 1,276,589 | Steinmetz | Aug. 20, 1918 |
| 2,042,234 | Lyle | May 26, 1926 |
| 2,191,315 | Guanella | Feb. 20, 1940 |
| 2,377,506 | McWhirter | June 5, 1945 |

FOREIGN PATENTS

| | | |
|---|---|---|
| 412,237 | Great Britain | June 22, 1934 |
| 668,906 | Germany | Dec. 13, 1938 |